United States Patent [19]

Sekmakas et al.

[11] Patent Number: 4,585,814
[45] Date of Patent: Apr. 29, 1986

[54] EPOXY-MALEATE-PHOSPHATE COPOLYMERS

[75] Inventors: Kazys Sekmakas, Palatine; Raj Shah, Schaumburg, both of Ill.

[73] Assignee: DeSoto, Inc., Des Plaines, Ill.

[21] Appl. No.: 609,798

[22] Filed: May 14, 1984

[51] Int. Cl.$^4$ ............... C08L 63/10; C08L 63/02; C08G 59/14; C08G 59/16

[52] U.S. Cl. ............... 523/416; 523/414; 523/424

[58] Field of Search ............... 525/530, 531; 523/414, 523/416

[56] References Cited

U.S. PATENT DOCUMENTS

| | | | |
|---|---|---|---|
| 3,524,903 | 8/1970 | Hargis | 525/531 |
| 3,574,794 | 4/1971 | Hargis | 525/530 |
| 4,028,434 | 6/1977 | Konter | 525/531 |
| 4,294,737 | 10/1981 | Sekmakas | 523/423 |
| 4,308,185 | 12/1981 | Evans | 525/530 |
| 4,434,278 | 2/1984 | Skisicm | 525/530 |

*Primary Examiner*—John C. Bleutge
*Assistant Examiner*—Patricia Short
*Attorney, Agent, or Firm*—Dressler, Goldsmith, Shore, Sutker & Milnamow, Ltd.

[57] ABSTRACT

There is disclosed solution copolymers of monoethylenically unsaturated monomers including a proportion of monoethylenically unsaturated carboxylic acid, with an oxirane-free epoxy acid ester phosphate having adducted onto the oxirane groups of a starting polyepoxide at least 10% thereof of ortho phosphoric acid as well as at least 0.5% by weight of a monoester of a saturated monohydric alcohol with a monoethylenically unsaturated dicarboxylic acid which resists homopolymerization, the remaining oxirane groups of the polyepoxide being esterified with monocarboxylic acid, etherified with monoalcohol or hydrolyzed with water. These copolymers can be neutralized with a volatile amine, especially ammonia and cured with aminoplast or phenoplast resins to provide coatings which cure to greater flexibility and better resistance to blushing on pasteurization exposure.

20 Claims, No Drawings

EPOXY-MALEATE-PHOSPHATE COPOLYMERS

DESCRIPTION

1. Technical Field

This invention relates to copolymers of monoethylenically unsaturated monomers with phosphate esters based on epoxy resins which have been reacted to consume all of the epoxy (1,2-oxirane) functionality, so that the ester which is present during the copolymerization is not an epoxide.

2. Background Art

Polyepoxide copolymers with monomers which include monoethylenically unsaturated carboxylic acids are known. These are produced by a graft polymerization process in the presence of the epoxy functional compound and incorporated into aqueous coating compositions by reaction of the acid copolymer with a volatile base which is usually an amine, a term which includes ammonia. Aqueous coating compositions of the type described are in commerce where they find use as interior sprays for sanitary cans. Efforts to use the commercially available aqueous coatings as an end enamel have not been successful because these coatings lack the flexibility and pasteurization resistance needed for end enamel use.

We have previously tried to improve these aqueous coatings by esterifying a portion of the polyepoxide with an unsaturated acid, such as monobutyl maleate, so that the subsequent copolymerization would include copolymerization with the unsaturation in the ester group and thus provide a more intimate association between the copolymer molecules and the polyepoxide molecules. This work is set forth in various patents, U.S. Pat. No. 4,404,336 being illustrative. While this technology provides a substantial advance, the copolymers disclosed therein are best used with volatile amines other than ammonia, and their adhesion could be improved. These are significant disadvantages.

It is desired to provide copolymers having improved properties, and to particularly provide copolymers which are more flexible and more resistant to blushing when subjected to pasteurizing conditions than the materials now in commerce. It is especially desired to provide aqueous coatings in which the copolymer is solubilized with ammonia at a higher solids content than was previously feasible since this lead to cost savings in the shipping of the product. Also, it is desired to lower the curing temperature which is needed to thermoset the coating.

In a companion application, we have disclosed graft copolymers similar to those used herein and which do not include any maleate component. The copolymers of this invention contain little grafting and cure to provide films possessing better film clarity and higher gloss in comparison with those in the said companion application.

DESCRIPTION OF INVENTION

In accordance with this invention, a solution copolymer of monoethylenically unsaturated monomers including a proportion of monoethylenically unsaturated carboxylic acid, is formed with an oxirane-free epoxy acid ester phosphate having adducted onto the oxirane groups of a starting polyepoxide at least 10% thereof of ortho phosphoric acid as well as at least 0.5% by weight of a monoester of a saturated monohydric alcohol with a monoethylenically unsaturated dicarboxylic acid which resists homopolymerization, the remaining oxirane groups of said polyepoxide being esterified with monocarboxylic acid, etherified with monoalcohol or hydrolyzed with water. The polyepoxide is preferably solid at room temperature (25° C.) which is referred to herein as normally solid, and any residual epoxide functionality is destroyed either before or after the reaction with phosphoric acid. The phosphoric acid is monofunctional in its reaction with the oxirane groups of the polyepoxide, and this leaves two unreacted POH groups. The monoethylenically unsaturated carboxylic acid is desirably used in an amount to provide the copolymer with an acid number of from 20-150.

The oxirane-free epoxy maleate phosphate is copolymerized with the monoethylenic monomers in solvent solution in the present of a free radical polymerization catalyst, which is preferably a peroxide used in an amount of at least about 2% of the monoethylenic monomers present. The result is a copolymer which includes little grafting and which is primarily a copolymer with the maleic ester groups which are introduced by adduction. This product is easily solubilized in water with the aid of a volatile amine, preferably ammonia, and it is characterized by finer particle size than the aqueous dispersions which were produced in our previously referred to companion application. This finer particle size may be the causative factor leading to the better film clarity and greater gloss which is achieved herein. These copolymers cure readily in the presence of added aminoplast resin or phenoplast resin, and they are characterized by higher solids content in the aqueous medium, and better cure indicated by greater flexibility and better resistance to blushing on exposure to pasteurization conditions. The added phosphoric acid provides a better and lower temperature cure than is possible without the addition of this acid.

The monoesters of a saturated monohydric alcohol with a monoethylenically unsaturated dicarboxylic acid which resists homopolymerization can vary with the alcohol selected and the acid which is chosen. $C_1$–$C_{18}$ alkanols, preferably $C_2$–$C_8$ alkanols are used. It is not desired to have the alcohol contain significant unsaturation because this provides too many unsaturataed groups. Thus, allyl alcohol leads to a tendency to gel. The preferred alcohol is a butanol, such as n-butanol or isobutanol, but ethanol, propanol, 2-ethoxy ethanol, 2-ethylhexanol, and the like, are all useful, alone or in combination.

Maleic acid, fumaric acid and itaconic acids will illustrate the unsaturated dicarboxylic acids which can be used. It is preferred to form the monoester from the acid in its anhydride form, but this is a background feature herein, and is itself well known.

The maleic half esters are especially preferred and introduce considerable economy into the products of this invention.

The polyepoxides used herein may be constituted by any resinous polyepoxide having a 1,2-epoxy functionality in excess of 1.0. The preferred materials have a 1,2-epoxy functionality in excess of 1.2 and sufficient molecular weight to be solid in the absence of organic solvent at room temperature (25° C.). This is termed normally solid. The most satisfactory polyepoxides are diglycidyl ethers of a bisphenol, especially those having a 1,2-epoxy equivalency of about 1.4 to about 2.0. These polyepoxides are well known and commercially available, the bisphenol usually used being bisphenol A.

While molecular weights of from about 350 to about 7,000 are useful, a molecular weight of from about 1,000 to about 5,000 is preferred. These weights are commonly obtained by calculation.

At least 10%, preferably at least 50%, of the oxirane groups in the starting polyepoxide are to be esterified with phosphoric acid. The remaining oxirane groups may be consumed in any desired fashion, preferably by esterification with a saturated monocarboxylic acid, like acetic acid or butyric acid, or by etherification with a saturated monohydric alcohol, like butanol or 2-ethylhexanol, or by hydrolysis with water. The consumption of the remaining oxirane groups may be carried out either before or after reaction with phosphoric acid, though any reaction with water is preferably carried out after the reaction with phosphoric acid is complete.

The phosphoric acid which is primarily contemplated is ortho phosphoric acid. However, if a $P_2O_5$-$H_2O$ mixture which is more concentrated than phosphoric acid is used, then subsequent hydrolysis with water will produce the same result as if ortho phosphoric acid had been used initially.

Complete consumption of the oxirane functionality prior to copolymerization is important. Unreacted oxirane functionality can introduce a measure of instability into coating compositions containing an aminoplast curing agent. It is difficult to consume the oxirane functionality during copolymerization because the unsaturated acids do not esterify with oxirane functionality under most copolymerization conditions. In this invention, the oxirane functionality is gone before the copolymerization is started.

The proportion of monoethylenically unsaturated monomers which may be copolymerized with the oxirane-free epoxy phosphate may vary considerably, but it is preferred to employ from 15% to 70% of monoethylenic monomers, based on the weight of the copolymer, to provide the desired copolymer product. These monomers include monoethylenic carboxylic acid, such as methacrylic acid or fumaric acid, to provide an acid number of from 20-150, preferably 50-120 in the final copolymer so that amine (preferably ammonia) and water can be added to provide a water dispersion which is either a solution or a colloidal dispersion.

The bulk of the monomers which are used (at least about 50% by weight) are nonreactive, which indicates that, aside from their polymerizable monoethylenic unsaturation, they do not react under the conditions of polymerization and use which are contemplated. This normally means that there are no functional groups except the single polymerizable ethylenic group. Styrene and vinyl toluene are particularly contemplated, though methyl acrylate, methyl methacrylate, ethyl acrylate, acrylonitrile and vinyl acetate will further illustrate the useful monoethylenically unsaturated monomers.

In the preferred systems, the only reactive monomer which is present is the monoethylenically unsaturated carboxylic acid. Monocarboxylic acids are useful, such as acrylic acid and methacrylic acid. Polycarboxylic acids are also useful, such as maleic acid, and itaconic acid. Acid selection is a secondary aspect of this invention.

Other reactive monoethylenic monomers may also be present in an amount up to about 20% of the total polymerizable monomers. These are illustrated by hydroxy monomers, such as 2-hydroxyethyl acrylate, amide monomers, such as acrylamide, N-methylol functional monomers, such as N-methylol acrylamide or methacrylamide, or an ether thereof, such as the butyl ether.

The copolymerization is itself conventional, being carried out in organic solvent solution using a free radical generating polymerization catalyst, preferably at least about 2% of a peroxide catalyst, such as benzoyl peroxide. Peroxide catalysts are accepted for the production of coatings for use in contact with food, and are thus preferred. The solvent is preferably water miscible and used in minimal amount, so that the polymerization is usually at 50% or higher solids content, preferably at least about 65%.

While aminoplast resins are preferably used for cure, such as hexamethoxymethyl melamine, one may also use phenoplast resins, such as an A-stage resol or a phenol-formaldehyde condensate which is dispersible in the aqueous dispersions of this invention. This class of water soluble and water dispersible curing agents for curing hydroxy functional resins is a matter of common knowledge in the art. Commercial products which may be used as curing agent are illustrated by Resimene X-2735 and American Cyanamid product Cymel 370. These various curing agents may be used in an amount up to about 40% of total resin solids, though their use is desirably minimized so that amounts of from 5% to 20% of total resin solids are preferred.

While ammonium hydroxide is preferred for solubilizing the acidic copolymeric product, organic amines, such as dimethyl ethanol amine, are also useful, and both are embraced by the language "volatile amine".

The resulting aqueous solutions cure to provide films characterized by superior resistance to extraction and they resist absorbing odor and flavor components of the foods and beverages which are packaged. They can be applied to any metal can interior, such as aluminum, stell and tin-plated steel. Use as a can end enamel is also particularly contemplated because of the superior flexibility and better pasteurization blush resistance which is obtained herein. Spray application and cure by baking at 400° F. for 3 minutes are particularly contemplated. Films of about 0.2-0.3 mil are usually formed. Good adhesion is obtained on all of the mentioned surfaces.

Throughout this application, all parts and proportions are by weight unless otherwise stated. This invention is illustrated as follows.

EXAMPLE 1

435 grams of a diglycidyl ether of bisphenol A having a molecular weight of about 435 (the Shell Company product Epon 829 may be used) is reacted with 185 grams of bisphenol A in 160 grams of 2-butoxy ethanol. The reaction is carried out by heating to 140° C. and allowing the temperature to rise to 170° C., whereupon it is held at 170° C. for 1 hour. 60 grams of maleic acid n-butanol half ester and 3.2 grams of 85% ortho phosphoric acid are then added and the mixture is held for 2 hours at 170° C. and then cooled to 140° C. It is to be noted that the phosphoric acid reactant brings in 15% of water with it, and the maleic half ester, the phosphoric acid and the water are sufficient to react with all of the oxirane groups in the diglycidyl ether. To insure completion of the reaction and the consumption of all the oxirane functionality, 1.0 gram of sodium carbonate is added, and the mixture is held at 140° C. for 1 hour. The sodium carbonate acts as an alkaline catalyst to encourage the esterification and hydrolysis reactions. The product is then cooled to 125° C. and 200 grams of butanol are added to complete the preparation of the epoxy maleate phosphate.

At this point a mixture of 205 grams ethyl acrylate, 60 grams methacrylic acid, and 75 grams styrene is prepared and 40 grams of cumene hydroperoxide is dissolved in 120 grams of butanol. These two solutions are slowly and concurrently added to the oxirane free epoxy maleate phosphate solution over a two and one half hour period at 120° C. to 125° C. and the mixture is held at that temperature range for an additional hour. 7 grams of tertiary-butyl perbenzoate are then added and held at temperature for 1 hour, and then 7 more grams of the same perbenzoate are added and held at temperature for one and one half hours to complete the copolymerization. The product is a copolymer which includes little grafting, and it provides a single phase resin product.

The product is cooled to 90° C. and 120 grams of 28% aqueous ammonia is added over 30 minutes. Then 1600 grams of deionized water is added to provide an aqueous dispersion having fine particle size and a solids content of 32% and an acid value of 47.

Upon reverse roll coat application on aluminum, steel and tin-plated steel panels in a thickness of 0.25 mil and baking for 3 minutes in an oven maintained at 400° F., good solvent resistant flexible coatings are obtained. These have better flexibility and better pasteurization blush resistance than the epoxy graft copolymer aqueous coatings now in commerce and which are shipped at about 22% solids content. The cured films are clearer and of higher gloss than the maleate-free systems in our companion application, and they are more adherent that the phosphate-free systems of our U.S. Pat. No. 4,404,336.

It should also be observed that the presence of the phosphoric acid ester groups serves the further function of lowering the curing temperature. The prior epoxy graft copolymers are conventionally cured in ovens maintained at 425° F. to 450° F. while a good cure can be obtained herein at temperatures as low as about 390° F.

What is claimed is:

1. A solution copolymer of monoethylenically unsaturated monomers including a proportion of monoethylenically unsaturated carboxylic acid, with an oxirane-free epoxy acid ester phosphate having adducted onto the oxirane groups of a starting polyepoxide at least 10% thereof of ortho phosphoric acid as well as at least 0.5% by weight of a monoester of a saturated monohydric alcohol with a monoethylenically unsaturated dicarboxylic acid which resists homopolymerization, the remaining oxirane groups of said polyepoxide being esterified with monocarboxylic acid, etherified with monoalcohol or hydrolyzed with water.

2. A solution copolymer as recited in claim 1 in which ortho phosphoric acid is adducted onto at least 50% of the oxirane groups of the starting polyepoxide.

3. A solution copolymer as recited in claim 1 in which said polyepoxide is a diglycidyl ether of a bisphenol having a 1,2-epoxy equivalency in the range of 1.4 to 2.0 and a molecular weight in the range of 350 to 7,000.

4. A solution copolymer as recited in claim 1 in which said polyepoxide is normally solid.

5. A solution copolymer as recited in claim 2 in which said polyepoxide is a diglycidyl ether of a bisphenol having a 1,2-epoxy equivalency in the range of 1.4 to 2.0 and a molecular weight in the range of 1,000 to 5,000.

6. A solution copolymer as recited in claim 5 in which said bisphenol is bisphenol A.

7. A solution copolymer as recited in claim 1 in which said monoester is the reaction product of $C_2$–$C_8$ alkanol with maleic anhydride.

8. A solution copolymer as recited in claim 1 in which said monoester is monobutyl maleate.

9. A solution copolymer as recited in claim 1 in which monoethylenically unsaturated monomers are used in an amount of from 15% to 70%, based on the weight of the copolymer, and said monoethylenically unsaturated carboxylic acid is present in an amount to provide the copolymer with an acid number of from 20–150.

10. A solution copolymer as recited in claim 9 in which said monoethylenically unsaturated carboxylic acid is present in an amount to provide the copolymer with an acid number of from 50–120.

11. A solution copolymer as recited in claim 10 in which said monoethylenically unsaturated carboxylic acid is acrylic acid or methacrylic acid.

12. A solution copolymer as recited in claim 9 in which said monoethylenically unsaturated monomers comprise at least 50% of monomers in which the single ethylenically unsaturated group is the sole reactive group.

13. A solution copolymer as recited in claim 12 in which said monomers and said oxirane-free epoxy phosphate are copolymerized in water-miscible organic solvent at a solids content of at least 50% in the presence of a peroxide polymerization catalyst in an amount of at least 2% of the weight of the monoethylenically unsaturated monomers present.

14. An aqueous coating composition comprising the solution copolymer of claim 1 dispersed in water with the aid of a volatile amine.

15. An aqueous coating composition as recited in claim 14 in which said amine is ammonia.

16. An aqueous coating composition as recited in claim 15 in which said coating contains a curing agent selected from aminoplast resins and phenoplast resins.

17. An aqueous coating composition as recited in claim 16 in which hexamethoxymethyl melamine is used as the curing agent in an amount of from 5% to 20% of total resin solids.

18. A solution copolymer as recited in claim 1 in which said polyepoxide is a diglycidyl ether of a bisphenol having a 1,2-epoxy equivalency in the range of 1.4 to 2.0 and a molecular weight in the range of 1,000 and 5,000, said monoester is monobutyl maleate, and said monoethylenically unsaturated monomers are used in an amount of from 15% to 70%, based on the weight of the copolymer, and include acrylic acid or methacrylic acid in an amount to provide the copolymer with an acid number of from 50–120.

19. A solution copolymer as recited in claim 18 in which hydrolysis with water is employed.

20. An aqueous coating composition comprising the solution copolymer of claim 19 dispersed in water with ammonia, said coating composition containing hexamethoxymethyl melamine curing agent in an amount of from 5% to 20% of total resin solids.

* * * * *